UNITED STATES PATENT OFFICE 2,212,193

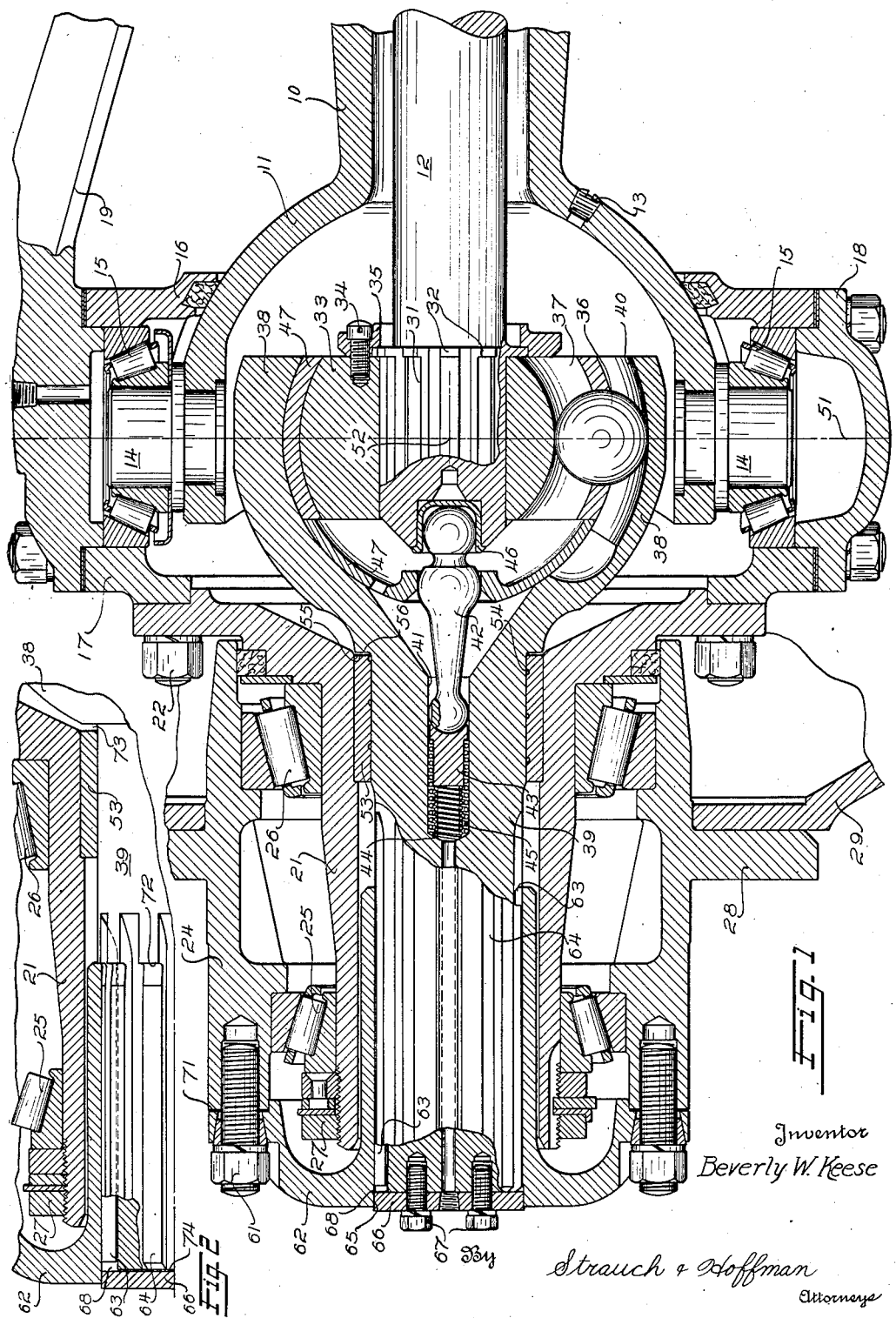

STEERING DRIVE AXLE

Beverly W. Keese, Oshkosh, Wis., assignor to The Timken-Detroit Axle Company, Detroit, Mich., a corporation of Ohio Application May 28, 1940, Serial No. 337,708

11 Claims. (Cl. 180—43)

This invention relates to drive axles for vehicles and the like, more particularly to drive axles, known in the art as steering drive axles, having dirigible wheels for steering purposes.

In my prior Patent No. 1,995,987, granted March 26, 1935, I have shown a steering drive axle embodying a spindle mounted for steering movement on a stationary housing, and a hub journalled on the spindle and connected to a driving shaft in the stationary housing by means of a universal joint.

Although the axle of Patent No. 1,995,987 represented a great advance in the art, and is still in wide use today, it is open to objections in certain classes of service. It is found that, in order to insure quiet and efficient operation, with a minimum of friction, it is necessary to maintain accurate alignment of the steering axis and the oscillating or turning axis of the universal joint, by inserting or removing shims from between the cap and the hub, to adjust the shafts and universal joint axially into the proper position. Improper alignment results in either increased friction in the balls of the joint or deflection in the driving shaft between the joint and the center or differential driving unit of the axle, or both, and it also renders the operation noisy; materially impairs the efficiency; and reduces the life of the unit.

Although in axles of fairly small capacity it is not expensive to accurately dimension the parts to secure proper initial alignment and no great difficulties are experienced in maintaining the proper adjustment throughout the life of the axle, in large units, particularly certain units designed for other than truck use, it is costly to manufacture them with the proper degree of accuracy to insure correct alignment and is often very troublesome, if not impractical, to maintain the alignment in the field through the adjustment just discussed.

I have now discovered that by mounting the shaft and universal joint assembly for free axial movement, and providing stops to limit the range of movement, it is unnecessary to manufacture the unit with the degree of accuracy required in the construction shown in Patent No. 1,995,987, and at the same time it is possible in many instances to obviate adjusting the unit throughout its life.

It is accordingly the major object of this invention to provide a steering drive axle in which the shafts and universal joint are free to undergo a limited amount of axial movement as the spindle undergoes steering movement, to allow the oscillating axis of the join to automatically center itself with respect to the steering axis.

Another important object is to provide a steering drive axle in which the shafts and universal joint are adapted to undergo free axial sliding movement, with stop means for limiting the amount of movement in each direction for preventing the oscillating axis of the joint from moving out of the range of operative relationship with respect to the steering axis, and for adjusting the range of movement in one direction.

A further object is to generally improve and refine certain details of the axle construction shown in my prior patent.

Further objects will become apparent as the specification proceeds in connection with the annexed drawing, and from the appended claims.

In the drawing,

Figure 1 is a longitudinal sectional view of a steering drive axle embodying the invention; and Figure 2 is a view similar to Figure 1 but shows a modified form of axle of the invention.

With continued reference to the drawing a stationary housing 10, having a ball portion 11, is adapted to be secured to the vehicle by springs or in any other suitable well known manner.

A driving axle shaft 12 in housing 10 is connected to any suitable prime mover. In the present instance, however, I have shown the axle as being associated with a motor vehicle with shaft 12 splined in the differential side gear (not shown) for free axial movement. Ball portion 11 is also provided with a lubricant plug 13, and a pair of trunnions 14.

Journaled on trunnions 14, by means of a pair of anti-friction bearings 15, are a pair of mating housing sections 16 and 17, the latter being detachably secured together along a plane containing the axis of the trunnions to form a unitary movable housing, as shown in Patent No. 1,995,987, so no other further description thereof will be given. The bottom bearing is held in place by a detachable cap 18 and top bearing is retained in place by a combined cap and drag link arm 19.

A hollow spindle 21 is detachably secured to housing section 17 by bolts 22, and is accordingly mounted for steering movement on housing 10 about a substantially vertical axis. It is illustrated as having a hub at 24 journaled thereon by means of anti-friction bearings 25 and 26, and is secured in place by a lock nut assembly 27. The hub is provided with a flange 28, to which brake-drum 29 is secured, and also upon which a vehicle wheel (not shown) may be demountably supported. The driving connection between shaft 12 and the hub is preferably constructed as follows:

Shaft 12 is provided with splines 31 and a shoulder 32. The well known form of "Rzeppa" form of universal joint has been illustrated in the drawing as coupling the shafts, and it comprises an inner member 33 having splines meshing with splines 31, and is pulled into engagement with shoulder 32 by means of bolts 34 and a ring 35, the latter abutting the rear face of the shoulder. The joint also employs a plurality of balls 36 riding in races 37 and 40 provided in member 33 and an outer member 38 respectively. Member 38 and an integrally formed shaft portion 39 having a bore 41 therein. Proper positioning of the balls to bisect the angle between shafts 12 and 39 is effected in well known manner by means of a pilot lever 42 cooperating at one end with a plunger 43 seating in bore 41 and acted upon by a pair of springs 44 and 45, and at the other end fits in a cup 46 in the end of shaft 12. The intermediate portion of lever 42 engages a cage member 47 cooperating with balls 36, so that when spindle 21 turns about the trunnions, lever 42 will rock the cage in the direction to dispose the balls in the proper plane.

By reason of the positive connection between member 33 and shaft 12, and the fact that members 33, 47 and 38 are coupled together by spherical surfaces, shafts 12 and 39 are restrained against axial movement relatively to each other, but they undergo bodily axial movement by reason of the spline connection of shaft 12 to the differential side gear. Although I have illustrated a specific form of universal joint, for purposes of making a complete disclosure of the invention, it is to be understood that any other suitable type of universal joint may be used without departing from the spirit of the invention, irrespective of whether it is of the accelerating or non-accelerating type. The novel floating shaft and stop combination of the invention will now be set forth, it being understood that for the most part the structure so far described is shown in my prior patent.

The axis about which spindle 21 turns in undergoing steering movements will hereinafter be referred to as the steering axis, and it is designated in the drawing by the line 51. The axis or point about which shafts 12 and 39 rock with respect to each other when the axle undergoes steering movement will hereinafter be referred to as the oscillating axis, and it is designated in the drawing by the reference character 52. The drawing illustrates the parts in the ideal condition for perfect operation, namely, oscillating axis 52 is coincident with line 51, the steering axis of the assembly.

The inner end of shaft 39 is journaled in a bushing 53 secured in spindle 21 and is provided with the usual oil distributing groove 54. Bushing 53 is also provided with an axially directed abutment face 55 which cooperates with an abutment face 56 provided on shaft 39.

It is accordingly apparent that when shoulder 56 has been brought into engagement with abutment 55, through movement of shaft 39 to the left, the entire shaft assembly is restrained against further outward movement. I preferably so dimension the parts that when the oscillating axis 52 is in alignment with the steering axis 51, as shown in the drawing, a running clearance of approximately one sixty-fourth of an inch exists between surfaces 55 and 56. In other words, these surfaces permit only one sixty-fourth of an inch outward movement of the shaft and universal joint assembly with respect to the steering axis.

Inward movement of the shafts and universal joint is preferably limited by the following assembly of parts. Secured to the outer end of hub 24, by a plurality of bolts 61, is a flanged sleeve 62 having internal splines 63 cooperating with splines 64 on shaft 39. Splines 63 terminate short of the outer end of the sleeve to provide a smooth bore 65 in which a cap member 66 is slidably and preferably sealingly mounted. Cap 66 is secured to the end of shaft 39 by a pair of cap screws 67 and is pulled into tight engagement with the end of the shaft.

The outer ends of splines 63 form a shoulder of abutment cooperating with cap 66, and the parts are preferably so dimensioned, that when the oscillating and steering axes are coincident as shown in the drawing, a clearance 68 exists between cap 66 and the end of splines 63. In practice I find that, if a clearance of three thirty-seconds of an inch is provided between cap 66 and the outer ends of splines 63, a very satisfactorily operating construction is provided. In other words, if during steering movement of the spindle, shaft 39 must move inwardly to compensate for angularity of the joint, it may move inwardly a distance of three thirty-seconds of an inch before it is stopped through engagement of cap 66 with splines 63. I have found that by providing the clearances just discussed the universal joint undergoes a self-centering action with respect to the steering axis during the steering operation.

The free axial movement of the shaft and universal joint assembly is also provided for the following further reasons:

Roller type wheel bearings are always manufactured to a plus .015 tolerance in width, and this tolerance on bearing 26 tends to push hub 24 outwardly and increase the dimension between the flange of sleeve 62 and shoulder 55 of bushing 53, which would tend to gall shoulder 56 against the bushing, unless an inward float were provided.

Also, most drive axles are so designed as to undergo torsional "wind-up" under heavy shocks, so as to avoid failure. Therefore, under heavy loading, shaft 12 will tend to wind up, either under direct torque or torsion, or torsional shock, and foreshorten, and should the splines in the differential temporarily restrict axial movement, the universal joint and shaft 39 may move inwardly sufficiently to compensate for this action. The axial sliding of the parts also compensates for other inaccuracies of the component parts of the axle, such as the surrounding housing, or the overall length of the main housing, and eliminates all deflections of the axle shafts.

If it is desired, either in the initial manufacture or for the purpose of securing an adjustment in the field, a plurality of shims 71 may be provided between hub 24 and sleeve 62, so that by disassembling the parts and removing one or more shims the degree of inward movement may be increased, or by inserting additional shims clearance 68 may be decreased. This makes it possible to provide any degree of clearance desired. The clearance between faces 55 and 56 is primarily a running clearance, and therefore does not usually require adjustment. It should be understood that both clearances are exaggerated in the drawing to more clearly illustrate this feature. However, if it is desired to adjust this clearance, shims may be inserted between the clamping faces of the spindle and housing member 17.

If desired, the parts may be so related that outward movement of the shaft and universal joint assembly is limited by non-rubbing parts, and in Figure 2 I have disclosed a construction of this character.

Referring to Figure 2, shaft 39 is provided with a shoulder 72 which cooperates with the inner end of sleeve 62 to limit outward movement of shaft 39, and if desired, a one sixty-fourth inch clearance may be provided to allow a slight outfloat. In this form of the invention, since outward movement of the shaft and universal joint assembly is limited by sleeve 62, a comparatively large clearance 73 (approximately one sixteenth inch) is provided between bushing 53 and the shoulder on the shaft, so as to avoid contact between these parts.

This axle may be adjusted in the same manner as the first described form, by inserting or removing shims 71. In this form of the invention, however, the shim adjustment equally affects both the outer and inner limits of movement of the parts, since it effects axial movement of sleeve 62, which limits both the inward and outward movements of the assembly. In other words, adjusting the sleeve outwardly will effect exactly equal outward movement of both the inner and outer stop faces, and vice versa.

It is also to be understood that, if desired, shims 74 may be placed under cap 66, to adjust the degree of infloat of the axle and shaft assembly in both forms of the invention.

It is accordingly apparent that I have provided novel steering drive axle assemblies in which the shafts and universal joint are free to undergo a limited amount of axial movement as the spindle undergoes steering movement, so that the oscillating axis may automatically center itself with respect to the steering axis, and that through the use of this novel construction the cost of the axles are materially reduced, and yet the efficiency, quietness and life of the constructions are considerably improved. Also, the axles are so designed that adjustments may be effected to increase or decrease the amount of axial movement of the shaft and universal joint assembly.

Although I preferably limit inward movement of the parts by having cap 66 engage the ends of splines 63, because these parts are rotating at the same angular speed and no rubbing engagement occurs, it is to be understood that, if desired, inward movement of the assembly may be limited by having an axially directed surface engage one of the housings without departing from the spirit of the invention and the appended claims are intended to embrace my invention when it assumes this form. Also the trunnions may be secured in the movable housing rather than in housing 10 if desired.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes, which come within the meaning and range of equivalency of the claims, are, therefore, intended to be embraced therein.

What is claimed and desired to be secured by United States Letters Patent is:

1. In a steering drive axle, a stationary housing and a hollow spindle pivotably connected for steering movements; a driving shaft in said stationary housing; a driven shaft in said spindle; a universal joint interconnecting said shafts for synchronous rotation; a hub journalled on said spindle; means coupling said hub to said driven shaft for synchronous rotation, but permitting free relative axial movement therebetween, whereby said driving and driven shafts and said universal joint may undergo bodily endwise movement with respect to said housing and spindle; means for limiting outward movement of said shafts, comprising a surface associated with said spindle adapted to engage an axially directed surface on said driven shaft; and means for limiting inward movement of said shafts, comprising a second pair of axially directed surfaces, said pairs of surfaces being spaced apart to provide a predetermined degree of axial movement of said driven shaft and universal joint, and allow the latter to automatically center itself with respect to the pivotal axis of said spindle on said stationary housing.

2. In a steering drive axle, a stationary housing and a hollow spindle pivotally connected for steering movements; a driving shaft in said stationary housing; a driven shaft journalled in said spindle; a universal joint located adjacent the axis of pivotal movement of said spindle on said housing interconnecting said shafts for synchronous rotation and restraining them against relative axial movement; a hub journalled on the outside of said spindle and restrained against axial movement with respect to said spindle; means coupling said hub to said driven shaft for synchronous rotation, but permitting relative axial movement therebetween, whereby said driving and driven shafts and said universal joint may undergo bodily endwise movement with respect to said housing and spindle; means for limiting outward movement of said shafts, comprising a surface associated with said spindle adapted to engage an axially directed surface on said driven shaft; and means for limiting inward movement of said shafts, comprising a second pair of surfaces normally disposed in axially spaced relationship and cooperating with said first-named pair of surfaces to maintain said universal joint with its oscillating axis adjacent the axis of pivotal movement of said spindle on said housing, but allowing a limited degree of movement to one side of said pivotal axis, to afford a self-centering action of said universal joint.

3. In a steering drive axle, a stationary housing; a hollow spindle mounted for pivotal movement about a steering axis on said stationary housing; a driving shaft in said stationary housing; a driven shaft in said spindle; a universal joint having an oscillating axis located adjacent said steering axis and interconnecting said shafts for synchronous rotation and restraining them against relative axial movement; a hub journalled on the outside of said spindle and restrained against axial movement with respect to said spindle; means coupling said hub to said driven shaft for synchronous rotation, but permitting relative axial movement therebetween, whereby said driving and driven shafts and said universal joint may undergo bodily endwise movement with respect to said housing and spindle; a cap detachably secured to the outer end of said driven shaft and slidably disposed in the outer end of said spindle; means for limiting outward movement of said shafts, comprising a surface associated with said spindle adapted to engage an axially directed surface associated with said driven shaft; and means for limiting inward movement of said shafts, comprising a second pair of surfaces axially spaced apart and cooperating with said first-named pair of surfaces to provide a limited degree of inward and outward movement of said driving and driven shafts and universal joint with respect to said spindle and housing, to thereby permit said steering and oscillating axes to undergo a self-centering action when said spindle undergoes steering movement.

4. In a steering drive axle, a stationary housing; a hollow spindle pivotally connected to said housing for steering movements about a fixed axis; a driving shaft in said stationary housing; a driven shaft in said spindle; a universal joint having an oscillating axis located adjacent said steering axis and interconnecting said shafts for synchronous rotation and restraining them against relative axial movement; a hub journalled on the outside of said spindle and restrained against axial movement with respect to said spindle; a flanged sleeve member splined over the outer end of said driven shaft for synchronous rotation therewith, whereby said driving and driven shafts and said universal joint may undergo bodily endwise movement with respect to said housing and spindle; means for adjustably securing said flange to said hub for endwise movement into selected axial positions; the splines in said sleeve terminating short of the outer end to provide a smooth-walled recess; a cap, slidably and sealingly associated with said recess and detachably secured to said shafts; means for limiting outward movement of said shafts, comprising a surface associated with said spindle and adapted to engage an axially directed surface associated with said driven shaft; and means for limiting inward movement of said shafts, comprising a second pair of surfaces axially spaced apart and cooperating with said first-named pair of surfaces to provide a limited degree of inward and outward movement of said driving and driven shafts and said universal joint, to thereby permit said oscillating axis to undergo a self-centering action with respect to said fixed axis.

5. In a steering drive axle, a stationary housing; a driving shaft in said housing; a hollow spindle pivotally connected to said housing for steering movements about a fixed axis; a driven shaft rotatable in said spindle; a universal joint having an oscillating axis located adjacent said fixed axis and interconnecting said shafts for synchronous rotation and restraining them against relative axial movement; a hub journalled on said spindle and restrained against axial movement with respect to said spindle; an internally splined sleeve coupling said hub to said driven shaft for synchronous rotation, but permitting relative axial movement therebetween, whereby said driving and driven shafts and said universal joint may undergo bodily endwise movement with respect to said housing and spindle; means for limiting outward movement of said shafts, comprising a surface associated with said spindle adapted to engage an axially directed surface on said driven shaft; and means for limiting inward movement of said shafts, comprising axially spaced surfaces associated with said hub and said sleeve adapted to abut each other when said shafts move inwardly a predetermined distance, thereby permitting said oscillating axis to undergo a self-aligning action with respect to said fixed axis.

6. In a steering drive axle, a stationary housing; a driving shaft in said housing; a hollow spindle pivotally connected to said housing for steering movements about a fixed axis; a driven shaft rotatable in a bushing in said spindle; a universal joint having an oscillating axis located adjacent said fixed axis and interconnecting said shafts for synchronous rotation and restraining them against relative axial movement; a hub journalled on said spindle and restrained against axial movement with respect to said spindle; an internally splined sleeve coupling said hub to said driven shaft for synchronous rotation, but permitting relative axial movement therebetween, whereby said driving and driven shafts and said universal joint may undergo bodily endwise movement with respect to said housing and spindle; means for limiting outward movement of said shafts, comprising a surface on said bushing adapted to be engaged by an axially directed surface on said driven shaft; and means for limiting inward movement of said shafts, comprising axially spaced surfaces associated with said hub and said sleeve adapted to abut each other when said shafts move inwardly a predetermined distance, thereby permitting said oscillating axis to undergo a self-aligning action with respect to said fixed axis.

7. In a steering drive axle, a stationary housing; a driving shaft in said housing; a hollow spindle pivotally connected to said housing for steering movements about a fixed axis; a driven shaft rotatable in said spindle; a universal joint having an oscillating axis located adjacent said fixed axis and interconnecting said shafts for synchronous rotation and restraining them against relative axial movement; a hub journalled on said spindle and restrained against axial movement with respect to said spindle; an internally splined sleeve coupling said hub to said driven shaft for synchronous rotation, but permitting relative axial movement therebetween, whereby said driving and driven shafts and said universal joint may undergo bodily endwise movement with respect to said housing and spindle; means for limiting outward movement of said shafts, comprising a surface associated with said spindle adapted to engage an axially directed surface on said driven shaft; and means for limiting inward movement of said shafts, comprising a cap secured to the outer end of said driven shaft and slidably mounted in said sleeve and adapted to abut a shoulder in said sleeve when said shafts move inwardly a predetermined distance, thereby permitting said oscillating axis to undergo a self-aligning action with respect to said fixed axis.

8. In a steering drive axle, a stationary housing; a driving shaft in said housing; a hollow spindle pivotally connected to said housing for steering movements about a fixed axis; a driven shaft rotatable in a bushing in said spindle; a universal joint having an oscillating axis located adjacent said fixed axis and interconnecting said shafts for synchronous rotation and restraining them against relative axial movement; a hub journalled on said spindle and restrained against axial movement with respect to said spindle; an internally splined sleeve coupling said hub to said driven shaft for synchronous rotation, but permitting relative axial movement therebetween, whereby said driving and driven shafts and said universal joint may undergo bodily endwise movement with respect to said housing and spindle; means for limiting outward movement of said shafts, comprising a surface on said bushing adapted to be engaged by an axially directed surface on said driven shaft; means for limiting inward movement of said shafts, comprising a cap secured to said driven shaft and adapted to abut a shoulder on said sleeve when said shafts move inwardly a predetermined distance, thereby permitting said oscillating axis to undergo a self-aligning action with respect to said fixed axis, and means for adjusting said sleeve axially with respect to said hub, for adjusting the limit of inward movement of said shafts and universal joint.

9. The axle construction defined in claim 8, wherein said cap is sealingly associated with the interior of said sleeve for preventing lubricant from escaping from said spindle.

10. The axle construction defined in claim 8, wherein said splines in said sleeve terminate short of the outer end thereof to provide said shoulder.

11. In a steering drive axle, a stationary housing; a driving shaft in said housing; a hollow spindle pivotally connected to said housing for steering movements about a fixed axis; a driven shaft rotatable in said spindle; a universal joint having an oscillating axis located adjacent said fixed axis and interconnecting said shafts for synchronous rotation and restraining them against relative axial movement; a hub journalled on said spindle and restrained against axial movement with respect thereto, said hub having a sleeve portion extending into said spindle and slidably but non-rotatably connected to said driven shaft, and means on said sleeve portion of said hub for limiting axial movement of said driven shaft in both directions, whereby said oscillating axis may undergo a self-aligning action with respect to said fixed axis, within the limits provided by said last-named means.

BEVERLY W. KEESE.